(12) United States Patent
Brewer et al.

(10) Patent No.: US 11,879,734 B2
(45) Date of Patent: Jan. 23, 2024

(54) LASER PROJECTION HARDWARE POSITIONAL DEVICE

(71) Applicant: Caterpillar Inc., Peoria, IL (US)

(72) Inventors: Michael Alan Brewer, Metamora, IL (US); Josh E. Huang, Peoria, IL (US); Michael H. Noble, Peoria, IL (US); Keith Maynard Egland, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 62 days.

(21) Appl. No.: 17/824,051

(22) Filed: May 25, 2022

(65) Prior Publication Data

US 2023/0384093 A1 Nov. 30, 2023

(51) Int. Cl.
*G01C 15/00* (2006.01)
*B23K 37/04* (2006.01)
*B23K 9/32* (2006.01)

(52) U.S. Cl.
CPC .............. *G01C 15/004* (2013.01); *B23K 9/32* (2013.01); *B23K 37/04* (2013.01); *G01C 15/006* (2013.01)

(58) Field of Classification Search
None
See application file for complete search history.

(56) References Cited

U.S. PATENT DOCUMENTS

| | | | | |
|---|---|---|---|---|
| 4,709,485 A | * | 12/1987 | Bowman | G01B 11/272 33/286 |
| 4,928,401 A | * | 5/1990 | Murray, Jr. | G01B 5/25 33/645 |
| 6,292,584 B1 | * | 9/2001 | Dulaney | C21D 10/005 219/121.85 |
| 6,628,378 B1 | * | 9/2003 | Marangoni | G01B 11/27 33/286 |
| 6,804,897 B1 | * | 10/2004 | Horn | G01B 11/27 33/606 |
| 7,003,890 B2 | * | 2/2006 | Kavounas | G01C 15/006 33/286 |
| 7,216,436 B2 | * | 5/2007 | Whitworth | B23Q 3/183 33/286 |
| 8,250,770 B2 | * | 8/2012 | Diefenderfer | F16H 57/022 33/286 |
| 2009/0211105 A1 | * | 8/2009 | Glaser | G01B 11/272 33/286 |

FOREIGN PATENT DOCUMENTS

| | | |
|---|---|---|
| CN | 101607355 | 12/2009 |
| CN | 202240100 | 5/2012 |
| CN | 105855700 | 8/2016 |

\* cited by examiner

*Primary Examiner* — Christopher W Fulton
(74) *Attorney, Agent, or Firm* — Schwegman, Lundberg & Woessner

(57) ABSTRACT

A system for positioning a tool or a component on a workpiece may include a laser configured to project a laser point on the workpiece. The laser may include a field of view and the laser may project the laser point upon objects within the field of view of the laser. The system for positioning a tool on a workpiece may also include a fixture configured to position the tool on the workpiece. The fixture may include a laser indicator configured to be aligned with the laser point projected on the workpiece. The fixture may also include a first tool receptacle configure to receive the tool and locate the tool on a portion of the workpiece outside the field of view of the laser.

20 Claims, 5 Drawing Sheets

LASER PROJECTION HARDWARE POSITIONAL DEVICE

TECHNICAL FIELD

This disclosure relates to a device for positioning a tool or a component on a workpiece, and more particularly, to a device for positioning a tool or a component on a workpiece using a laser. Even more particularly, this disclosure relates to a device for positioning a tool or a component on a workpiece outside a field of view of a laser.

BACKGROUND

To manufacture vehicles, machinery, and implements, components can be formed into and/or attached to a welded structure (e.g., a frame or supporting structure). The manufacturing of vehicles, machinery, or implements requires a high degree of accuracy in the placement of the components. Devices, such as lasers, may be used to aid in the placement of components on the welded structure. However, lasers are only as good as their field of view because the laser cannot project a laser point on an area of the welded structure obstructed from the field of view of the laser.

Chinese Patent Application CN 105,855,700 assigned to Chengdu Guoguang Electric Co. Ltd., discloses a protective fixture for welding of a traveling-wave tube welded antenna. The protective fixture is generally a C-shaped cylindrical chamber and comprises a base and a protective cover, the base, and the protective cover are disposed respectively at two ends of the protective fixture, and the base and the protective cover are laterally provided with axially through welding ports.

SUMMARY OF THE INVENTION

In one example, a system for positioning a tool or a component on a workpiece may include a laser configured to project a laser point on the workpiece. The laser may include a field of view and the laser may project the laser point upon objects within the field of view of the laser. The system for positioning a tool on a workpiece may also include a fixture configured to position the tool on the workpiece. The fixture may include a laser indicator configured to be aligned with the laser point projected on the workpiece. The fixture may also include a first tool receptacle configure to receive the tool and locate the tool on a portion of the workpiece outside the field of view of the laser.

In another example, a method of using a system to position a tool or a component on a workpiece. The system may include a laser configured to project a laser point on the workpiece and a fixture having a laser indicator and a first tool receptacle. The method may include projecting the laser point on the workpiece when the workpiece is located within a field of view of the laser. The method may also include positioning the fixture on the workpiece so that the laser indicator is aligned with the laser point projected on the workpiece. The method may also include inserting the tool into the first tool receptacle to position the tool in a position on the workpiece that is outside the field of view of the laser.

In yet another example, a fixture used in a system for positioning a tool or a component on a workpiece. The system may include a laser configured to project a laser point on the workpiece positioned within a field of view of the laser. The fixture may include a laser indicator configured to be aligned with the laser point projected on the workpiece. The fixture may also include a tool receptacle configured to receive the tool and position the tool on a portion of the workpiece outside the field of view of the laser.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
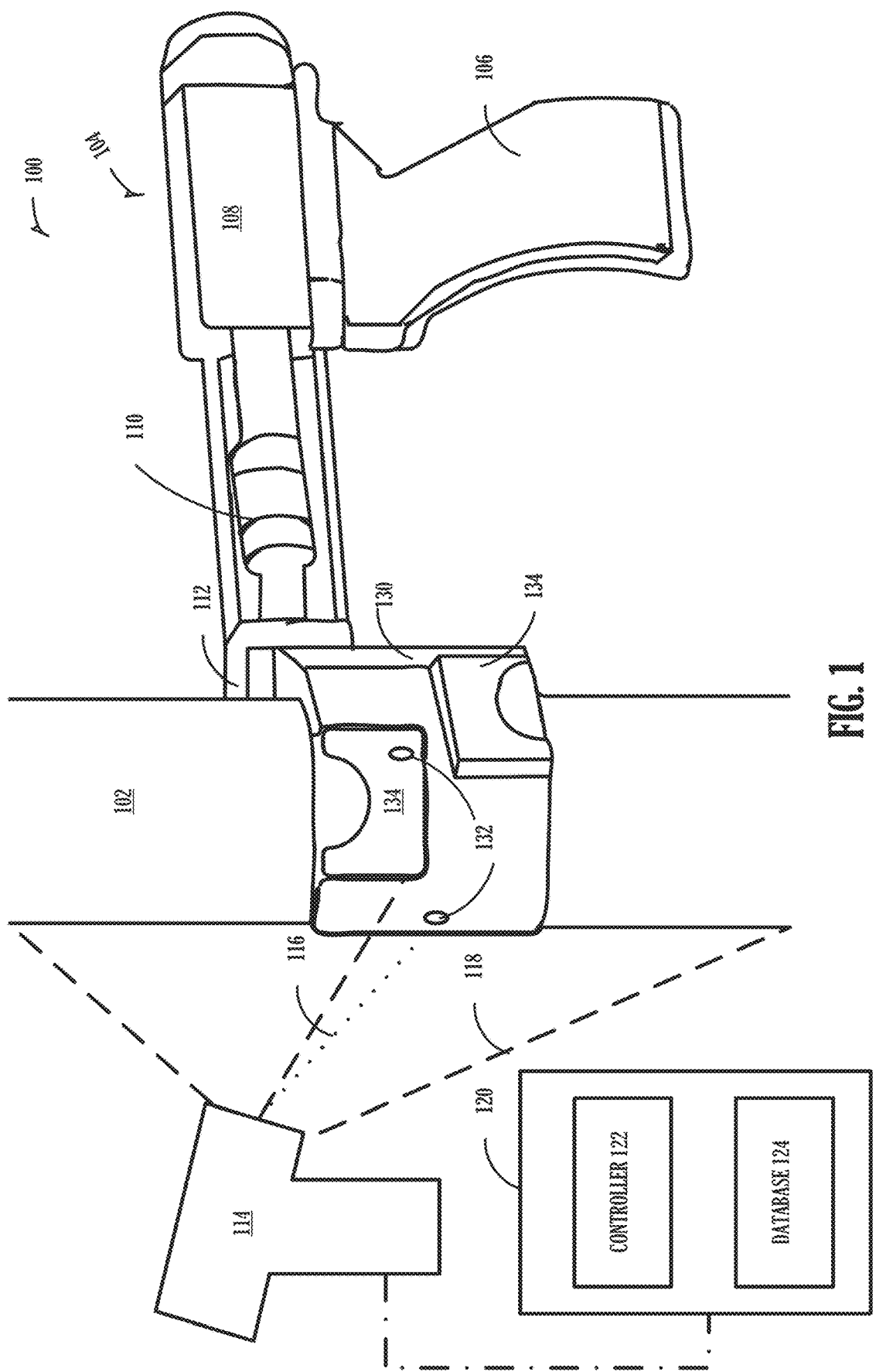
FIG. 1 is a perspective view of an example of a system for positioning a tool on a workpiece.

FIG. 1 is a perspective view of an example of a system 100. The system 100 may be configured to position a tool or a component on a workpiece. The system 100 may include a workpiece 102, a tool 104, a laser projection system 114, and a fixture 130.

The workpiece 102 may require components formed therein or attached thereto to create a final assembly. As such, the workpiece 102 may be a single piece, a sub-assembly, or a complete assembly. As shown in FIG. 1, the workpiece 102 may be a round tube. In another examples, the workpiece 102 may be a square tube, bar, rod, plate, I-channel, or any other shaped material that may be used in an assembly of a vehicle, machine, or implement. In some examples, the workpiece 102 may be metallic. In other examples, the workpiece 102 may be any other material used in the assembly of a vehicle, machine, or implement.

Figure 2:
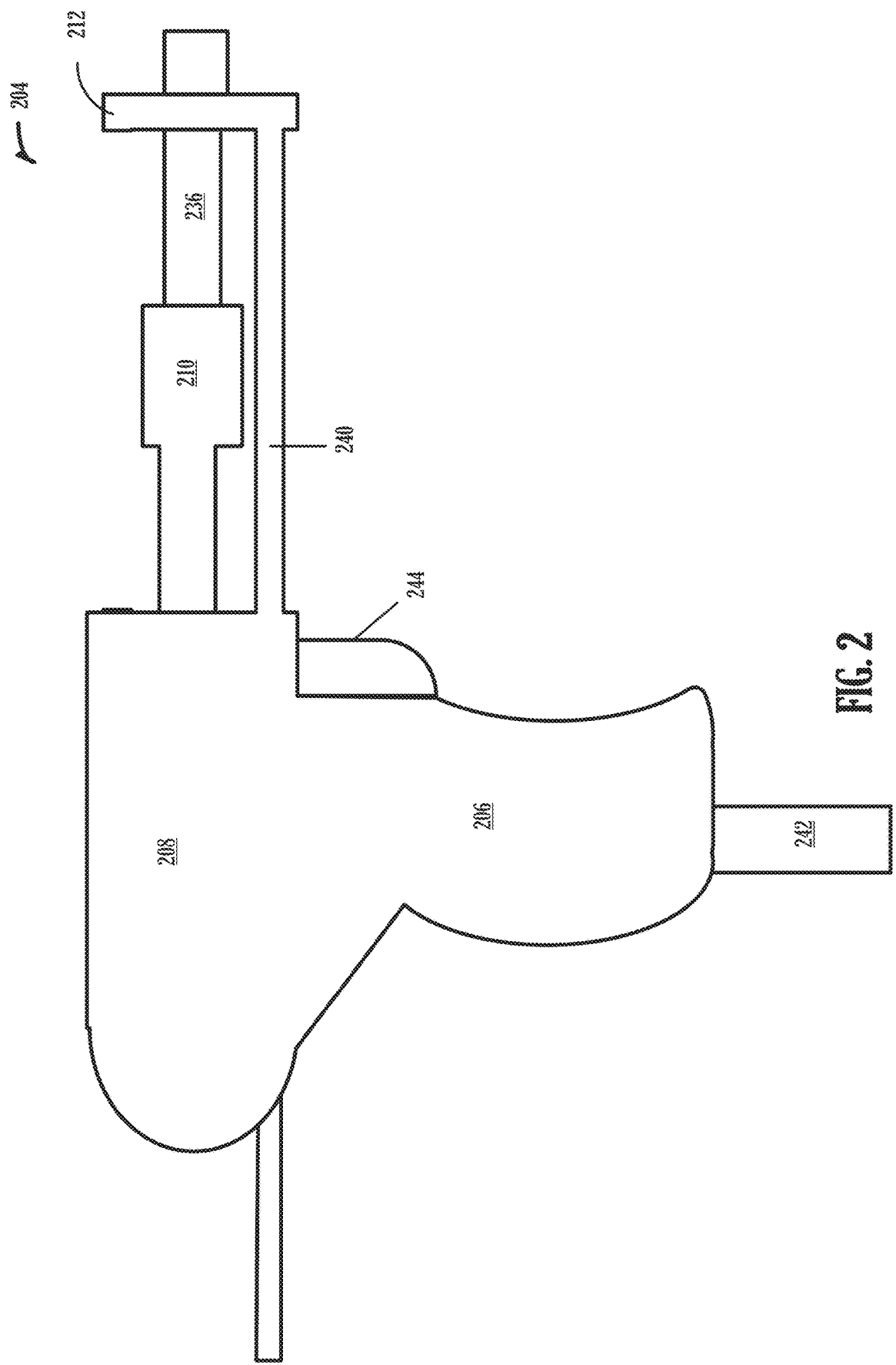
FIG. 2 is a perspective view of an example of a welding device.

The tool 104 may be configured to form or attach various components to the workpiece 102. In one or more examples, the tool 104 may be used to form a hole, groove, or threads on the workpiece 102. In another example, the tool 104 may be used to attach, weld, or add a component to the workpiece 102. The tool 104 may include a handle 106, a housing 108, an interchangeable chuck 110, and an arc shield 112. In the examples of FIGS. 1 and 2, the tool 104 may be a stud draw welding tool. For example, the tool 104 may be a Nelson® Stud Welding System. In one or more examples, the tool 104 may be any other stud welding system, or any other tool used to attach, weld, or add a component to the workpiece 102. The tool 104 with the handle 106, the housing 108, the interchangeable chuck 110, and the arc shield 112 will be discussed below with reference to FIG. 2.

The laser projection system 114 may be configured to project a laser point (hereinafter "laser 116") on the workpiece 102 to position the tool 104. The laser projection system 114 may analyze a 3D model of the desired manufacture, determine the placements of one or more required components, and project the laser 116 on the workpiece 102 indicative of a position of a component thereon the workpiece 102.

The laser 116 may be generated within the laser projection system 114. The laser projection system 114 may have multiple operating parameters for the laser 116. For example, the laser 116 may be green, red, yellow, blue, or any other color laser that can be generated. In examples, the laser 116 may be projected onto the workpiece 102 as a dot, a square, a triangle, or any other shape that a laser can be projected. In more examples, the laser 116 may have adjustable power, or brightness, such that the laser can be used in various environments. For example, if the laser projection system 114 is used within a bright environment, the power of the laser 116 can be increased to make the projection of the laser 116 upon the workpiece 102 clearer.

In one or more examples, the laser projection system 114 may generate multiple iterations of the laser 116. For example, the laser projection system 114 may project a first example of the laser 116 to indicate one type of component be formed or attached to the workpiece 102 and may project a second example of the laser 116 to indicate another type of component be formed or attached to the workpiece 102. For example, the first example of the laser 116 may be a first color and the second example of the laser 116 may be a second color. In another example, the first example of the laser 116 may be a first shape and the second example of the laser 116 may be a second shape.

The laser projection system 114 may project the laser 116 on any surface within a field of view 118 of the laser 116. The field of view 118 of the laser may be limited by the mechanical design of laser projection system 114. For example, the field of view of the laser 116 may be limited by a range of motion on a laser projector within the laser projection system 114. In one or more examples, the laser 116 may be improved by adding one or more mirrors (not shown) to the laser projection system 114 that are used by the laser projection system 114 to redirect and reflect the laser 116. Regardless, the one or more mirrors cannot project the laser projection system 114 onto a position of the workpiece 102 that is obstructed from the field of view 118 of the laser 116.

The laser projection system 114 may be electrically or wirelessly connected to a control system 120. The control system 120 may be configured to analyze a 3D CAD model, calculate a location of a component, and determine whether the location of the component is within the field of view 118 of the laser 116. If the location of the component is within the field of view 118 of the laser 116, the laser projection system 114 can instruct an operator to form a feature at the location indicated by the laser 116 with a specific tool. If the location of the feature is outside the field of view 118 of the laser projection system 114, the system may output to a user an identity of the required fixture, and project a laser 116 on the workpiece 102 in a position of the workpiece within the field of view 118 to position one more tool receptacles in a position outside the field of view 118 of the laser projection system 114, and indicate to the operator which tool and which tool receptacle the operator should place the tool to form and/or attach a feature to the workpiece 102.

In examples, the control system 120 may include a controller 122, and a database 124.

The controller 122 may be configured to calculate a position of the laser 116 and send a signal to the laser projection system 114 to communicate the position of the laser 116 and change the operating parameters of the laser projection system 114. The controller 122 may include one or more processors, microprocessors, microcontrollers, electronic control modules (ECMs), electronic control units (ECUs), programmable logic controllers (PLCs), or any other suitable means for electronically controlling the functionality of the laser projection system 114. The controller 122 may be configured to operate according to a predetermined algorithm or set of instructions for controlling the laser projection system 114 based on various operating conditions of the laser projection system 114, such as the complexity of a CAD model loaded into the controller 122 or a required location of a component being added or formed on the workpiece 102.

Such an algorithm or set of instructions can be stored in the database 124, can be read into an on-board memory of the controller 122, or preprogrammed onto a storage medium or memory accessible by the controller 122, for example, in the form of a floppy disk, hard drive, optical medium, random access memory (RAM), read-only memory (ROM), or any other suitable computer-readable storage medium commonly used in the art (each referred to as a "database"), which can be in the form of a physical, non-transitory storage medium.

The control system 120 may include one or more human-machine interfaces (now shown) for inputting commands to the control system 120 for controlling the laser projection system 114, and for outputting information related to an operation of the laser projection system 114. The one or more human-machine interfaces may include various output devices, such as screens, video screens, monitors and the like that can be used to display information, warnings, data, such as text, numbers, graphics, icons, and the like, regarding the status of the laser projection system 114. The one or more human-machine interfaces may also include a plurality of input interfaces for receiving information and command signals from various switches and sensors associated with the laser projection system 114 and a plurality of output interfaces for sending control signals to various systems of the laser projection system 114.

The fixture 130 may be configured to position the tool 104 or a component (not shown) on the workpiece 102. As shown in FIG. 1, the fixture 130 may have a generally semi-circular profile to conform around the workpiece 102. The semi-circular profile of the fixture 130 may extend from a portion of the workpiece 102 that is within the field of view 118 of the laser projection system 114 to a portion of the workpiece 102 that is outside the field of view 118 of the laser projection system 114. In one example, the fixture 130 may be manufactured, formed, or created using steel, copper, iron, or combinations thereof. In another example, the fixture 130 may be manufactured, formed, or created using high-density foam, polymer, or combinations thereof. In yet another example, the fixture 130 may be formed using additive manufacturing. The fixture 130 may include a laser indicator 132 and a tool receptacle 134.

The laser indicator 132 may be configured to align the fixture 130 with the laser 116 project onto the workpiece 102 by the laser projection system 114. The laser indicator 132 may be formed in or on the fixture 130 to indicate a precise location thereon the fixture 130. In examples, the laser indicator 132 can be a shape formed in the fixture 130. For example, the laser indicator 132 may be a triangle, square, circle, or any other shape that can be used to align the laser 116 on the fixture 130. In examples, the laser indicator 132 can be formed on the fixture 130. For example, the laser indicator 132 may be a ridge, bump, or any other feature that can be formed on the fixture 130 that can be used to align the laser 116 on the fixture 130.

The tool receptacle 134 may be configured to position the tool 104 or the component on the workpiece 102. The tool receptacle 134 may be formed into the fixture 130, such that, the tool receptacle 134 may be configured to receive a component of the tool 104. As shown in FIG. 1, the fixture 130 may include multiple of the tool receptacle 134. The tool receptacle 134 may be spread around the semi-circular profile of the fixture 130. Also, as shown in FIG. 1, the tool receptacle 134 can be formed in opposite edges of the fixture 130. For example, one or more of the tool receptacle 134 may be formed in a top edge of the fixture 130 and one or more of the tool receptacle 134 may be formed in a bottom edge of the fixture 130.

For example, the tool receptacle 134 can be formed in the fixture 130 in a shape that may receive the arc shield 112 or the tool 104. As such, the arc shield 112 of tool 104 may position the tool 104 within the tool receptacle 134. When the tool 104 is positioned within the tool receptacle 134 and the laser indicator 132 is aligned with the laser projection system 114 the tool 104 may form or attach a component to the workpiece 102 through a portion of the tool receptacle 134 configured to receive a working piece (e.g., the stud 236 of FIG. 2). Thus, the laser projection system 114 may project the laser 116 to align the laser indicator 132 of the fixture 130 and position the tool 104 at a precise location on the workpiece 102. The working piece of the tool 104 may be a bit, stud, rivet, bolt, screw, or any other working piece that can be used to form or attach to the workpiece 102. In another example, the tool receptacle 134 may include a ridge or an appendage, or any other external formation formed on the fixture 130 that can receive and position the tool 104 on the fixture 130.

In yet another example, a laser indicator 132 may be formed on or attached to the tool receptacle 134 to provide alternate laser indicators around the fixture 130. For example, the human-machine interface can display a message to an operator instructing them to use the laser indicator 132 on the tool receptacle 134 as indicated by a reference numeral or a marking. In another example, the laser projection system 114 can project the laser 116 with a circular profile such that the laser 116 fits within a portion of the tool receptacle 134 configured to receive the working piece of the tool 104 and the human-machine interface can display a message to an operator instructing them to use the tool receptacle 134 as indicated by a reference numeral or a marking.

In examples, the control system 120 may have a CAD model and/or dimensions of the fixture 130 stored in the database 124. The control system 120, and more specifically, the controller 122 may use the CAD model and/or dimensions of the fixture 130 stored on the database 124 to aid in the placement of a feature on a workpiece outside the field of view 118 of the laser projection system 114. For example, by knowing the dimensions of the fixture 130 the control system 120 can backward calculate where a laser indicator (e.g., the laser indicator 132 and/or any of the tool receptacle 134) can be aligned with a laser to properly place the feature on the workpiece 102. In examples, the control system 120 may have multiple fixtures stored within the database 124.

In yet another example, the fixture 130 may include a strap or latch (not shown) that helps hold the fixture 130 on the workpiece 102 In another example, the fixture may include a clamp, set pins, or any other mechanisms that may be used to attach the fixture 130 to the workpiece 102.

FIG. 2 is a perspective view of an example of the tool 204. Examples of the tool 204 may be used in system 100 (FIG. 1), for example, the tool 104 (FIG. 1). The tool 204 may be configured to form or attach features or components on to or in various workpieces. For example, the tool 204 may be used to form or attach features or components onto the workpiece 102 (FIG. 1). The tool 204 may include a handle 206, a body 208, an adjustable chuck 210, an arc shield 212, the stud 236, an adjustment rail 240, and a power port 242.

The handle 206 may be configured to control the tool 204 and permit electrical communication therethrough. The handle 206 may be shaped and sized to fit within a hand of an operator. The handle 206 may include an ergonomic design to decrease the strain on an operator throughout an extended period of use. For example, the handle 206 may have a curve to fit within the palm of an operator. The handle 206 may include a trigger 244. The trigger 244 may be configured to turn on and off the tool 204. For example, when the trigger 244 is compressed, the trigger 244 may permit power through the tool 204. In contrast, when the trigger 244 is released, the trigger 244 may block power through the tool 204. In examples, the trigger 244 may bias toward an off position.

The body 208 may be configured to permit the adjustment rail 240 therethrough, transmit electricity therethrough, and actuate the adjustable chuck 210 to operate the tool 204 when the trigger 244 is compressed. The body 208 may be generally cylindrical. The body 208 may extend from the handle 206 such that the body 208 will rest on a top of an operator's hand when the tool 204 is within the grasp of the operator. The body 208 may include one or more power sources to actuate the adjustable chuck 210 and operate the tool 204. For example, the body 208 may include a cylinder, motor, actuator, or any other energy source that can actuate the adjustable chuck 210 of the tool 204.

The adjustable chuck 210 may be configured to receive the stud 236. The adjustable chuck 210 may extend and retract from the body 208. The adjustable chuck 210 may be adjusted to fit different diameters of the stud 236. For example, the adjustable chuck 210 may have a collar that when rotated in a first direction decreases a diameter of the adjustable chuck 210, and when rotated in a second direction increases the diameter of the adjustable chuck 210. The adjustable chuck 210 may conduct electricity to electrically charge the stud 236.

The arc shield 212 may be configured to contain the arc when the tool 204 is welding the stud 236 to a workpiece (e.g., the workpiece 102 from FIG. 1). In one example, the arc shield 212 may be a ceramic ferrule. The arc shield 212 may help contain the weld pool while the stud 236 is being welded to the workpiece. The arc shield 212 may help insulate the weld pool while the stud 236 is welded to the workpiece to prevent oxidation. The arc shield 212 may be placed against the workpiece to support the tool 204 while actuating the tool 204.

The stud 236 may be configured to be welded to the workpiece. The stud 236 may be a bar or a rod and may be any size that can fit within the adjustable chuck 210. The stud 236 may be made of steel, aluminum, copper, or any combination thereof. The stud 236 may include threads, holes, ridges, or grooves formed therein before the stud 236 is attached to the workpiece.

The adjustment rail 240 may be configured to adjust the arc shield 212. As shown in the example of FIG. 1, the adjustment rail 240 may extend through the body 208 of the tool 204. The tool 204 may include two of the adjustment rail 240. For example, a second of the adjustment rail 240 may be on a plane into the page, and thus may not be visible in FIG. 2. The body 208 may include one or more clamps that can secure the adjustment rail 240 at a desired location within the body 208. In examples, each of the adjustment rail 240 may be connected to the arc shield 212.

The power port 242 may be configured to electrically connect the tool 204 to a laser controller (not shown). The power port 242 may permit electrical, pneumatic, hydraulic, or any combination thereof to pass through and into the tool 204 to actuate the power source within the body 208.

Figure 3:
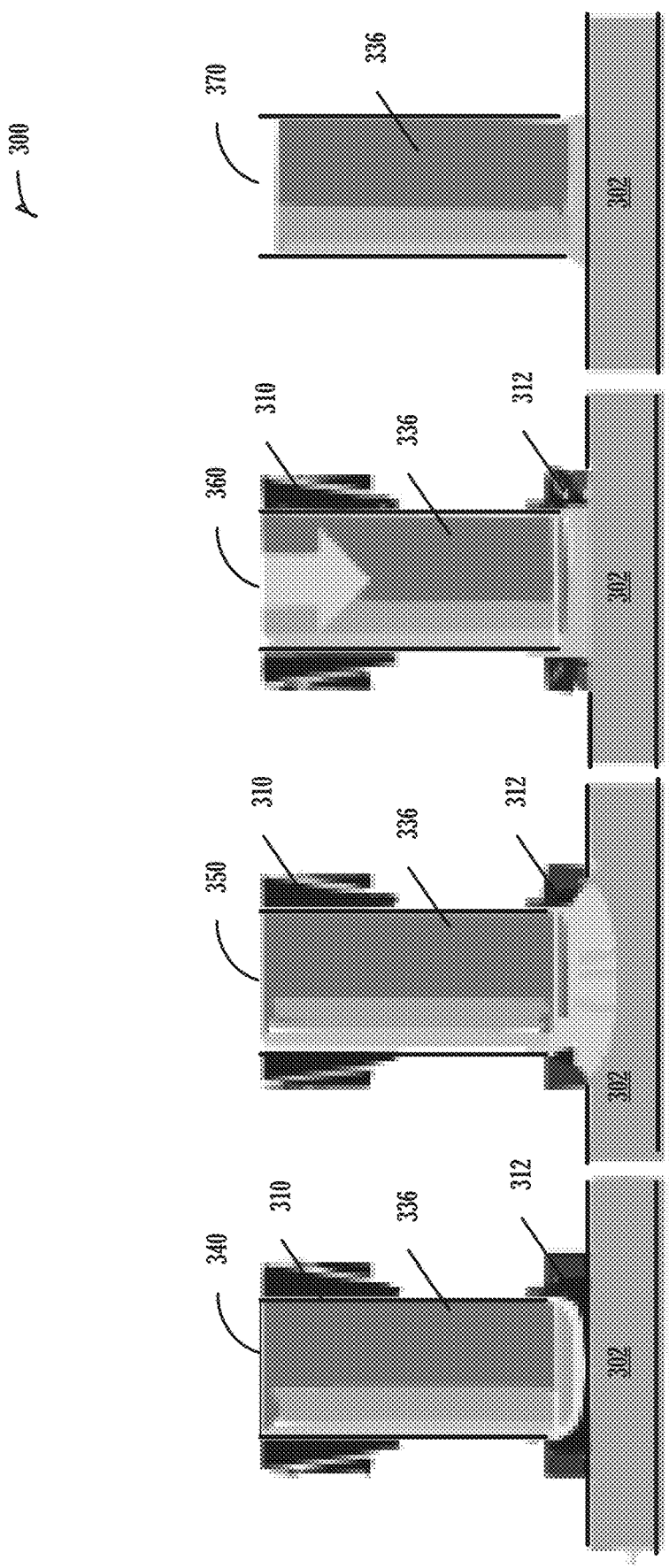
FIG. 3 is a schematic example of a draw welding technique.

FIG. 3 is a schematic example of a process 300 of welding a stud 336 to a workpiece 302. A tool, for example, the tool 104 or the tool 204, may be used to attach the stud 336 to a workpiece 302.

At step 340, the tool can be placed such that the stud 336 contacts the workpiece 302. The stud 336 is held within the interchangeable chuck 310. Moreover, the arc shield 312 surrounds the stud 336 where the stud 336 contacts the workpiece 302. As the stud 336 is in contact with the workpiece 302 the trigger, for example, the trigger 244 (FIG. 2), may be compressed to begin the welding process.

At step 350, the tool can actuate to retract the interchangeable chuck 310 to generate a space between the stud 336 and the workpiece 302 while the electrical current flows through the stud 336 to the workpiece 302. The space between the stud 336 and the workpiece 302 may create an electrical arc that may heat the stud 336 and the workpiece 302 to generate a weld pool. As shown in FIG. 3, the interchangeable chuck 310 may continue to hold the stud 336 within the tool and the arc shield 312 may surround the arc between the stud 336 and the workpiece 302. The arc shield 312 helps prevent oxidation of the weld pool as the stud 336 and the workpiece 302 combine.

At step 360, the tool can actuate to extend the interchangeable chuck 310 to press the stud 336 into the weld pool generated by the arc between the stud 336 and the workpiece 302. While the stud 336 is pressed into the weld pool between the stud 336 and the workpiece 302, the arc shield 312 helps maintain the shape of the weld pool and helps prevent oxidation as the weld pool harden and welds the stud 336 and the workpiece 302 together.

At step 370, the interchangeable chuck 310 may be loosed and the tool may be removed from the stud 336. As the tool is removed, the workpiece 302 is also removed from around the weld. Once the tool is removed, the stud 336 and the workpiece 302 are welded together to form a new assembly.

Figure 4:
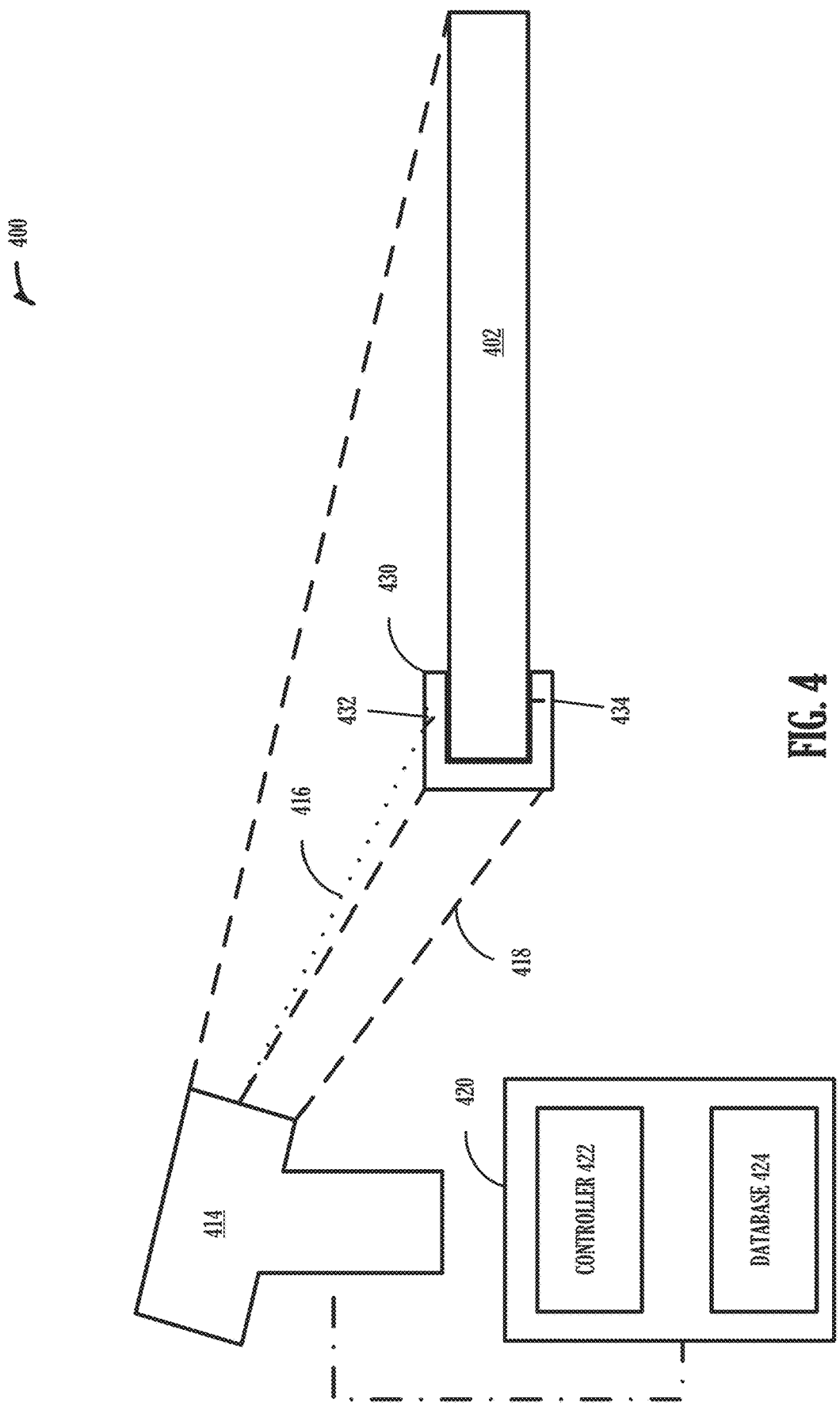
FIG. 4 is a perspective view of an example of a system for positioning a tool on a workpiece.

FIG. 4 is a perspective view of an example of a system 400 for positioning a tool on a workpiece 402. The system 400 may be configured to position a tool or a component on the workpiece 402. The system 400 may include a laser projection system 414 and a fixture 430.

The workpiece 402 may require components formed therein or attached thereto to create a final assembly. As such, the workpiece 402 may be a single piece, a sub-assembly, or a complete assembly. As shown in FIG. 4, the workpiece 402 may be a plate. In another examples, the workpiece 402 may be a round tube, square tube, bar, rod, I-channel, or any other shaped material that may be used in an assembly of a vehicle, machine, or implement. In some examples, the workpiece 402 may be metallic. In other examples, the workpiece 402 may be any other material used in the assembly of a vehicle, machine, or implement.

The laser projection system 414 may be configured to project a laser point (hereinafter "laser 416") on the workpiece 402 to position the tool thereon the workpiece 402. The laser projection system 414 may analyze a 3D model of the desired manufacture, determine the placements of one or more required components, and project the laser 416 on the workpiece 402 indicative of a position of a component thereon the workpiece 402.

The laser 416 may be generated within the laser projection system 414. The laser projection system 414 may have multiple operating parameters for the laser 416. For example, the laser 416 may be green, red, yellow, blue, or any other color laser that can be generated. In examples, the laser 416 may be projected onto the workpiece 402 as a dot, a square, a triangle, or any other shape that a laser can be projected. In more examples, the laser 416 may have adjustable power, or brightness, such that the laser can be used in various environments. For example, if the laser projection system 414 is used within a bright environment, the power of the laser 416 can be increased to make the projection of the laser 116 upon the workpiece 402 clearer.

In one or more examples, the laser projection system 414 may generate multiple iterations of the laser 416. For example, the laser projection system 414 may project a first example of the laser 416 to indicate one type of component be formed or attached to the workpiece 402 and may project a second example of the laser 416 to indicate another type of component be formed or attached to the workpiece 402. For example, the first example of the laser 416 may be a first color and the second example of the laser 416 may be a second color. In another example, the first example of the laser 416 may be a first shape and the second example of the laser 416 may be a second shape.

The laser projection system 414 may project the laser 416 on any surface within a field of view 418 of the laser 416. The field of view 418 of the laser may be limited by the mechanical design of laser projection system 414. For example, the field of view of the laser 416 may be limited by a range of motion on a laser projector within the laser projection system 414. In one or more examples, the laser 416 may be improved by adding one or more mirrors (not shown) to the laser projection system 414 that are used by the laser projection system 414 to redirect and reflect the laser 416. Regardless, the one or more mirrors cannot project the laser projection system 414 onto a position of the workpiece 402 that is obstructed from the field of view 418 of the laser 416.

The laser projection system 414 may be electrically or wirelessly connected to a control system 420. The control system 420 may be configured to analyze a 3D CAD model, calculate a location of a component, determine whether the location of the component is within the field of view 418 of the laser 416, output to a user if a fixture, and an identity of a fixture, is required, and project a laser 416 on the workpiece 402 in a position of the component within the field of view 418, or a position within the field of view 418 indicative of a position of the component outside the field of view 418. The control system 420 may include a controller 422, and a database 424.

The controller 422 may be configured to calculate a position of the laser 416 and send a signal to the laser projection system 414 to communicate the position of the laser 416 and change the operating parameters of the laser projection system 414. The controller 422 may include one or more processors, microprocessors, microcontrollers, electronic control modules (ECMs), electronic control units (ECUs), programmable logic controllers (PLCs), or any other suitable means for electronically controlling the functionality of the laser projection system 414. The controller 422 may be configured to operate according to a predetermined algorithm or set of instructions for controlling the laser projection system 414 based on various operating conditions of the laser projection system 414, such as the complexity of a CAD model loaded into the controller 422 or a required location of a component being added or formed on the workpiece 402.

Such an algorithm or set of instructions can be stored in the database 424, can be read into an on-board memory of the controller 422, or preprogrammed onto a storage medium or memory accessible by the controller 422, for example, in the form of a floppy disk, hard drive, optical medium, random access memory (RAM), read-only memory (ROM), or any other suitable computer-readable storage medium commonly used in the art (each referred to as a "database"), which can be in the form of a physical, non-transitory storage medium.

The control system 420 may include one or more human-machine interfaces (now shown) for inputting commands to the control system 420 for controlling the laser projection system 414, and for outputting information related to an operation of the laser projection system 414. The one or more human-machine interfaces may include various output devices, such as screens, video screens, monitors and the like that can be used to display information, warnings, data, such as text, numbers, graphics, icons, and the like, regarding the status of the laser projection system 414. The one or more human-machine interfaces may also include a plurality of input interfaces for receiving information and command signals from various switches and sensors associated with the laser projection system 414 and a plurality of output interfaces for sending control signals to various systems of the laser projection system 414.

The fixture 430 may be configured to position the tool or the component on the workpiece 402. As shown in FIG. 4, the fixture 430 may have a U-channel profile to conform around the workpiece 402. The U-channel profile of the fixture 430 may extend from a portion of the workpiece 402 that is within the field of view 418 of the laser projection system 414 to a portion of the workpiece 402 that is outside the field of view 418 of the laser projection system 414. In one example, the fixture 430 may be manufactured, formed, or created using steel, copper, iron, or combinations thereof. In another example, the fixture 430 may be manufactured, formed, or created using high density foam, polymer, or combinations thereof. In yet another example, the fixture 430 may be formed using additive manufacturing. The fixture 430 may include a laser indicator 432 and a tool receptacle 434.

The laser indicator 432 may be configured to align the fixture 430 with the laser 416 project onto the workpiece 402 by the laser projection system 414. The laser indicator 432 may be formed in or on the fixture 430 to indicate a precise location thereon the fixture 430. In examples, the laser indicator 432 can be a shape formed in the fixture 430. For example, the laser indicator 432 may be a triangle, square, circle, or any other shape that can be used to align the laser 416 on the fixture 430. In examples, the laser indicator 432 can be formed on the fixture 430. For example, the laser indicator 432 may be a ridge, bump, or any other feature that can be formed on the fixture 430 that can be used to align the laser 416 on the fixture 430.

The tool receptacle 434 may be configured to position the tool or the component on the workpiece 402. The tool receptacle 434 may be formed into the fixture 430, such that, the tool receptacle 434 may be configured to receive a component of the tool. The fixture 430 may include one or more tool receptacle 434 that can be positioned in a portion of the workpiece 402 outside the field of view 418 of the laser projection system 414. Thus, the laser projection system 414 may project the laser 416 to align the laser indicator 432 of the fixture 430 and position the tool at a precise location on the workpiece 402. In another example, the tool receptacle 434 may include a ridge or an appendage, or any other external formation formed on the fixture 430 that can receive and position the tool on the fixture 430.

In yet another example, a laser indicator 432 may be formed on or attached to the tool receptacle 434 to provide alternate laser indicators around the fixture 430. For example, the human-machine interface can display a message to an operator instructing them to use the laser indicator 432 on the tool receptacle 434 as indicated by a reference numeral or a marking. In another example, the laser projection system 414 can project the laser 416 with a circular profile such that the laser 416 fits within a portion of the tool receptacle 434 configured to receive the working piece of the tool and the human-machine interface can display a message to an operator instructing them to use the tool receptacle 434 as indicated by a reference numeral or a marking.

INDUSTRIAL APPLICABILITY

Figure 5:
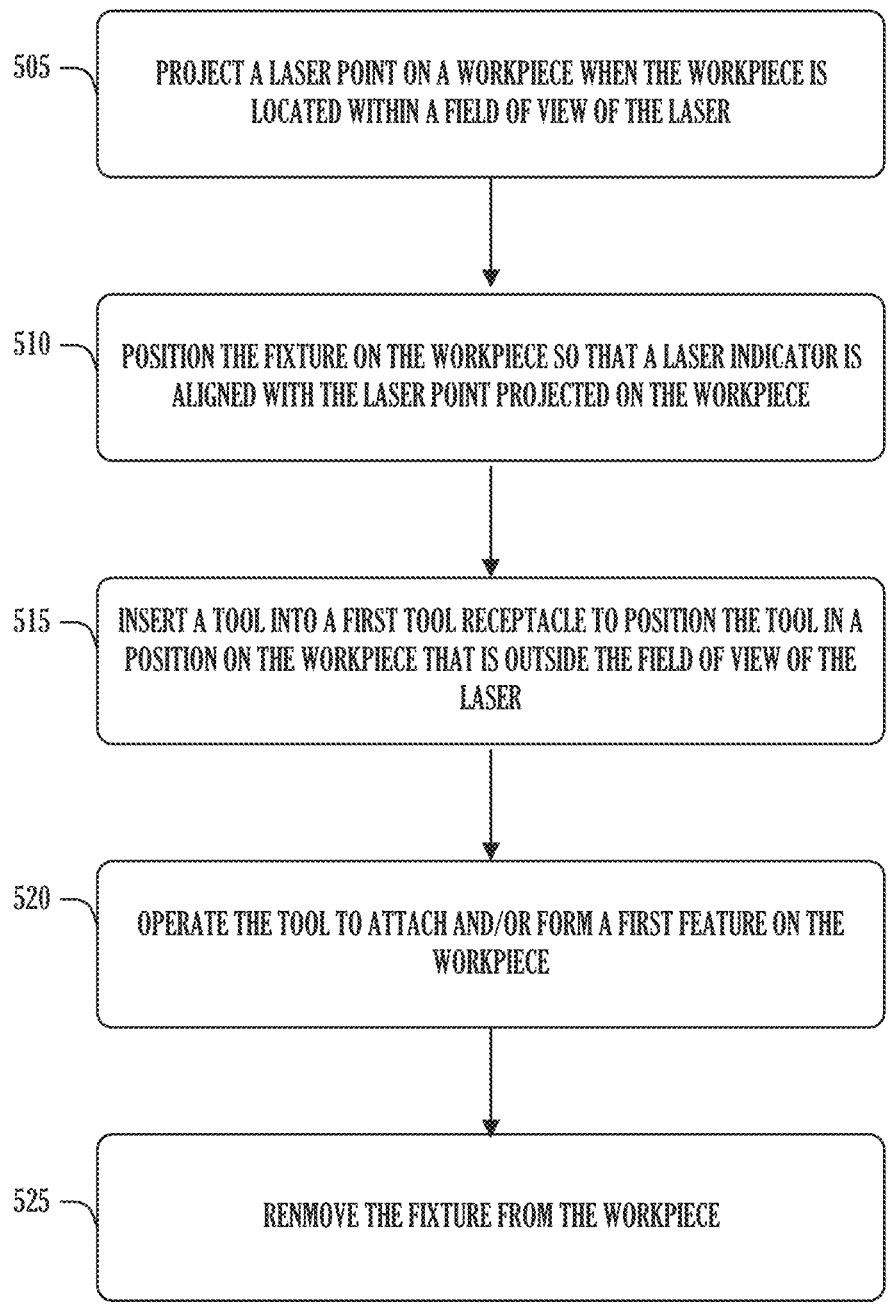
FIG. 5 is a flowchart showing a method of using a system for positioning a tool on a workpiece.

In one or more operable examples of the present disclosure, a method of attaching and/or forming a feature on a workpiece (hereinafter "method 500") may be used to add components to the workpiece. FIG. 5 is a flowchart showing the method 500 of using a system for positioning a tool to attach and/or form features on the workpiece.

At step 505, the method 500 may include projecting a laser point on a workpiece when the workpiece is located within a field of view of a laser. For example, a laser system (e.g., laser projection system 114 if FIG. 1 or laser projection system 414 of FIG. 4) may be used to project a laser point on a workpiece. For example, the laser point may be the laser 116 of FIG. 1 and/or the laser 416 of FIG. 4. The laser system, for example, the laser projection system 114 of FIG. 1 and/or the laser projection system 414 of FIG. 4 may include a field of view, for example, the field of view 118 of laser projection system 114 and/or the field of view 418 of the laser projection system 414, respectively. In examples, the workpiece may be the workpiece 102 of FIG. 1 or the workpiece 402 of FIG. 4. In another example, the workpiece may be any other workpiece that needs a feature or component formed and/or attached thereon.

At step 510, the method 500 may include positioning the fixture on the workpiece so that a laser indicator is aligned with the laser point projected on the workpiece. In examples, the fixture may be the fixture 130 from FIG. 1 or the fixture 430 from FIG. 4. The fixture may be installed on the workpiece so that the laser indicator, for example, the laser indicator 132 of FIG. 1 or the laser indicator 432 of FIG. 4, respectively, is aligned with the laser point projected on the workpiece. In examples, the fixture may be positioned on the workpiece such that one of the tool receptacles, for example, one of the tool receptacle 134 of FIG. 1 or one of the tool receptacle 434 of FIG. 4, respectively, is aligned with the laser point projected on the workpiece. In yet another example, the fixture may include a plurality of laser indicators, where each of the laser indicators include a reference label and a human-machine interface of the laser may display which laser indicator should be aligned with the laser point on the workpiece. In examples, there may be multiple fixtures and the human-machine interface of the laser may display which fixture should be aligned with the laser point on the workpiece.

At step 515, the method 500 may include inserting a tool into a first tool receptacle to position the tool in a position on the workpiece that is outside the field of view of the laser. The tool, for example, the tool 104 of FIG. 1 or the tool 204 of FIG. 2, respectively, may be used to form and/or attach a feature on the workpiece. In examples, the human-machine interface may display the fixture and the tool receptacle that the tool should be placed in to properly position the tool thereon the workpiece. In examples, the tool may be positioned to attach and/or form a feature on the workpiece outside the field of view of the laser.

At step 520, the method 500 may include operating the tool to attach and/or form a first feature on the workpiece. In examples, the tool 104 of FIG. 1, the tool 204 of FIG. 2, and/or another tool, for example a drill, rivet tool, Dremel, or any other tool that can form or attach a feature to a workpiece, may be used to form and/or attach a feature to the workpiece.

At step 525, the method 500 may include removing the fixture from the workpiece. The operator may remove the fixture from the workpiece to prepare for attaching and/or forming the next feature on the workpiece. In examples, an operator may indicate that the feature was formed and/or attached and the laser system may send instructions for the next feature attached to the workpiece. For example, the instructions may include which fixture, tool, and new position should be used for the next feature.

The above detailed description is intended to be illustrative, and not restrictive. The scope of the disclosure should, therefore, be determined with references to the appended claims, along with the full scope of equivalents to which such claims are entitled.

What is claimed is:

1. A system for positioning a tool or a component on a workpiece, the system comprising:
   a laser configured to project a laser point on the workpiece, the laser comprising a field of view, the laser configured to project the laser point upon objects within the field of view of the laser; and
   a fixture configured to position the tool on the workpiece, the fixture comprising:
      a laser indicator configured to be aligned with the laser point projected on the workpiece; and
      a first tool receptacle configured to receive the tool and locate the tool on a portion of the workpiece outside the field of view.

2. The system of claim 1, wherein the workpiece is a tube, and the fixture includes a semi-circular profile such that the laser indicator is adjacent a portion of the tube within the field of view the laser, and the first tool receptacle is positioned adjacent the portion of the tube outside the field of view of the laser.

3. The system of claim 2, wherein the fixture further comprises:
   a second tool receptacle configured to receive the tool, wherein the first tool receptacle and the second tool receptacle are positioned in two positions adjacent the portion of the tube outside the field of view of the laser.

4. The system of claim 2, wherein the fixture further comprises:
   a plurality of alternate tool receptacles configured to receive the tool, wherein the first tool receptacle and the plurality of alternate tool receptacles are positioned in a plurality of positions adjacent the portion of the tube outside the field of view of the laser.

5. The system of claim 1, wherein the workpiece is a plate, and the fixture includes a u-channel profile such that the laser indicator is located adjacent a portion of the plate within the field of view of the laser, and the first tool receptacle is positioned adjacent the portion of the plate outside the field of view of the laser.

6. The system of claim 5, wherein the fixture further comprises:
   a plurality of alternate tool receptacles configured to receive the tool, wherein the first tool receptacle and the plurality of alternate tool receptacles are positioned in a plurality of positions adjacent the portion of the plate outside the field of view of the laser.

7. The system of claim 1, wherein the tool is a draw welding tool.

8. A method of using a system to position a tool or a component on a workpiece, the system having a laser configured to project a laser point on the workpiece and a fixture having a laser indicator and a first tool receptacle, the method comprising:
   projecting the laser point on the workpiece when the workpiece is located within a field of view of the laser;
   positioning the fixture on the workpiece so that the laser indicator is aligned with the laser point projected on the workpiece; and
   inserting the tool into the first tool receptacle to position the tool in a position on the workpiece that is outside the field of view of the laser.

9. The method of claim 8, wherein the workpiece is a tube and the fixture including one or more alternate tool receptacles, the method further comprising:
   inserting the tool into the first tool receptacle or any of the one or more alternate tool receptacles to position the tool in a position on the tube outside the field of view of the laser.

10. The method of claim 8, wherein the workpiece is a plate and the fixture includes one or more alternate tool receptacles, the method further comprising:
   positioning the fixture on the workpiece so that the laser indicator of the fixture is aligned with the laser point projected on the workpiece; and
   inserting the tool into the first tool receptacle or any of the one or more alternate tool receptacles to position the tool in a position on the plate outside the field of view of the laser.

11. The method of claim 8, the system having a second fixture including one or more tool receptacles, the method further comprising:
   operating the tool to attach a first feature on the workpiece;
   removing the fixture from the workpiece;
   positioning the second fixture on the workpiece so that the laser indicator on the second fixture is aligned with the laser point projected on the workpiece;
   inserting the tool into the one or more tool receptacles to position the tool in a position on the workpiece outside the field of view of the laser; and
   operating the tool to attach a second feature on the workpiece in a different position than where the first feature is attached to the workpiece.

12. The method of claim 8, the system having a second fixture including one or more tool receptacles, the method further comprising:
   operating the tool to form a first feature on the workpiece;
   removing the fixture from the workpiece;
   positioning the second fixture on the workpiece so that the laser indicator on the second fixture is aligned with the laser point projected on the workpiece;
   inserting the tool into the one or more tool receptacles to position the tool in a position on the workpiece outside the field of view of the laser; and
   operating the tool to form a second feature on the workpiece in a different position than where the first feature is attached to the workpiece.

13. The method of claim 8, the system having a second fixture including one or more tool receptacles, the method further comprising:
   operating the tool to form a first feature on the workpiece;
   removing the fixture from the workpiece;

positioning the second fixture on the workpiece so that the laser indicator on the second fixture is aligned with the laser point projected on the workpiece;

inserting the tool into the one or more tool receptacles to position the tool in a position on the workpiece outside the field of view of the laser; and operating the tool to attach a second feature on the workpiece in a different position than where the first feature is attached to the workpiece.

14. A fixture used in a system for positioning a tool or a component on a workpiece, the system having a laser configured to project a laser point on the workpiece positioned within a field of view of the laser, the fixture comprising:

a laser indicator configured to be aligned with the laser point projected on the workpiece; and a tool receptacle configured to receive the tool and position the tool on a portion of the workpiece outside the field of view of the laser.

15. The fixture of claim 14, wherein the workpiece is a tube, the fixture further comprising:

a semi-circular profile configured to fit on the tube such that the laser indicator is positioned on a portion of the tube that the laser configured to project the laser point thereon, and the tool receptacle is positioned on the portion of the tube outside the field of view of the laser.

16. The fixture of claim 15, the fixture further comprising:

a plurality of alternate tool receptacles configured to receive the tool, wherein the tool receptacle and the plurality of alternate tool receptacles are positioned in a plurality of positions on the portion of the tube outside the field of view of the laser.

17. The fixture of claim 14, wherein the workpiece is a plate, the fixture comprising:

a u-channel profile such that the laser indicator is located on a portion of the plate that the laser configured to project the laser point thereon, and the tool receptacle is positioned on the portion of the plate outside the field of view of the laser.

18. The fixture of claim 17 further comprising:

a second tool receptacle configured to receive the tool, wherein the tool receptacle and the second tool receptacle are positioned in two positions on the portion of the plate outside the field of view of the laser.

19. The fixture of claim 17 further comprising:

a plurality of alternate tool receptacles configured to receive the tool, wherein the tool receptacle and the plurality of alternate tool receptacles are positioned in a plurality of positions on the portion of the plate outside the field of view of the laser.

20. The fixture of claim 14 further comprising:

a removable attachment mechanism configured to removably attach the fixture to the workpiece.

* * * * *